Nov. 20, 1956 — H. ORNE — 2,771,222
LIME SPREADER
Filed Aug. 11, 1953 — 2 Sheets-Sheet 1
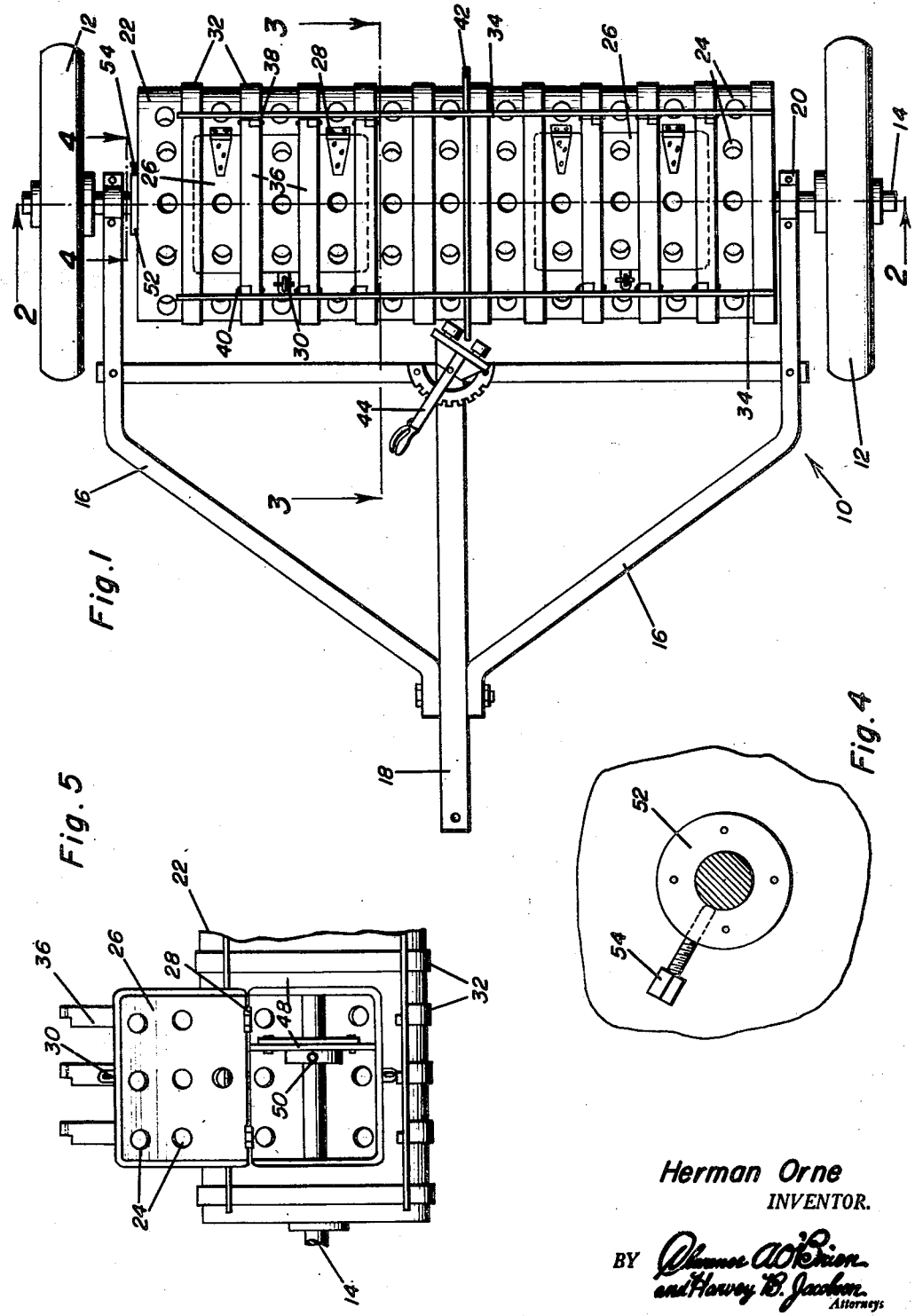
Herman Orne
INVENTOR.

Nov. 20, 1956
H. ORNE
2,771,222
LIME SPREADER
Filed Aug. 11, 1953
2 Sheets—Sheet 2
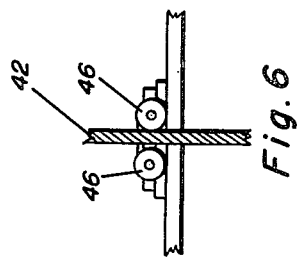
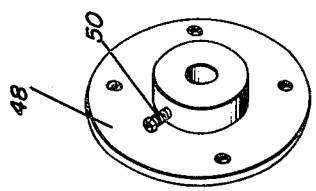
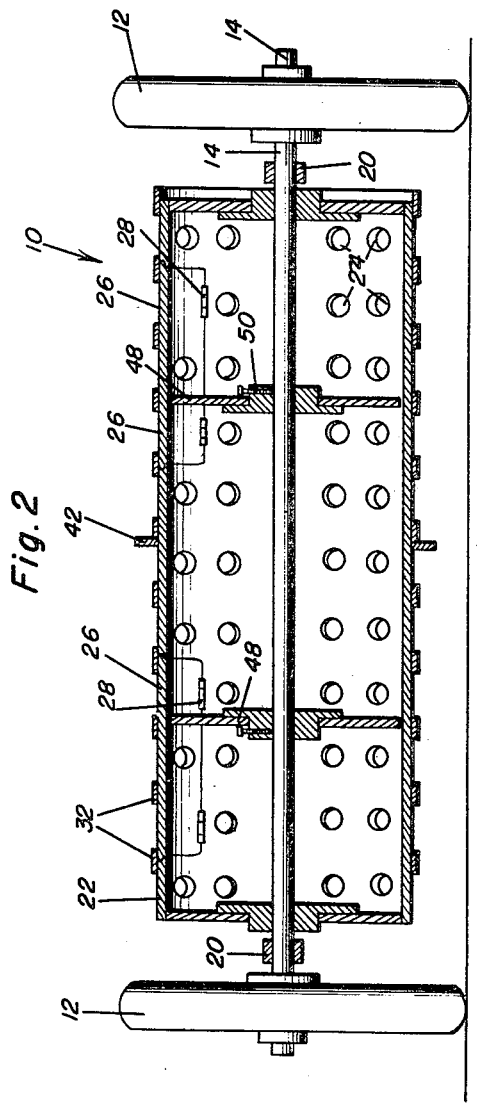
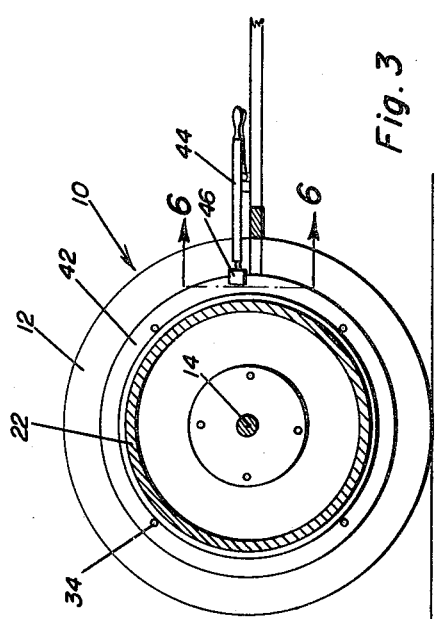
Herman Orne
INVENTOR.
BY

United States Patent Office 2,771,222
Patented Nov. 20, 1956

2,771,222

LIME SPREADER

Herman Orne, Pepin, Wis., assignor of thirty-three and one-third percent to Donald Orne and thirty-three and one-third percent to Wilbur Orne, Pepin, Wis.

Application August 11, 1953, Serial No. 373,481

2 Claims. (Cl. 222—171)

This invention relates to a lime spreader and more specifically provides a rotatable drum-type lime spreader.

An object of this invention is to provide a lime spreader having a rotatable drum with a plurality of dispensing apertures in the periphery thereof.

Another object of this invention is to provide a novel lime spreader having a plurality of dispensing openings and means to regulate the flow of lime from such openings.

A further object of this invention is to provide a lime spreader having a rotatable drum wherein the drum is rigidly secured to a rotating axle.

A still further object of this invention is to provide a lime spreader having a rotatable drum with a plurality of baffles in said drum to maintain the lime in a level condition when the ground or soil upon which the lime is dispensed is unlevel.

Another important object of this invention is to provide a lime spreader having flow regulating means which may be operated to adjust the rate of discharge of the lime while the lime spreader is in motion or stationary.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the lime spreader of this invention showing the general relationship of the various components of this invention;

Figure 2 is a longitudinal, vertical section taken substantially along section line 2—2 of Figure 1 showing details of the rotatable drum with the baffles therein and the relationship of the dispensing apertures and the aperture closures;

Figure 3 is a transverse, vertical section taken substantially along section line 3—3 in Figure 1 showing details of the regulating actuator;

Figure 4 is a transverse, vertical section taken substantially along section line 4—4 in Figure 1 showing details of the drum mounting on the axle;

Figure 5 is a fragmental, detail view showing the specific structure of one of the access doors;

Figure 6 is a fragmental, vertical section taken substantially along section line 6—6 in Figure 3 showing details of the connection between the operating handle and the movable flow regulator; and Figure 7 is a perspective view of the baffle attaching flange.

Referring now more specifically to Figures 1 and 2 of the drawings, it will be seen that the numeral 10 generally designates a lime spreader having a pair of ground engaging supporting wheels 12 with an axle 14 extending therebetween and rotatable therewith. The wheels 12 are provided with the usual pawl mechanism wherein one of the wheels 12 is allowed to back up while the lime spreader 10 is turning a corner.

Mounted on the axle 14 adjacent the supporting wheels 12 is a tractor hitch 16 of generally triangular configuration and having a tongue 18 for connection to a tractor draw bar (not shown) and a pair of bearing members 20 journaled on said axle 14. Mounted between bearing members 20 and rigid with the axle 14 is a drum 22 having a plurality of peripherally spaced apertures 24 arranged in longitudinally spaced rows. A pair of doors 26 are hingedly secured in the periphery of the drum 22 by the use of hinge means 28 and secured in position by a hasp 30 wherein the hinges 28 and hasp 30 are recessed to give the periphery of the drum a smooth surface. A plurality of longitudinally spaced peripheral rings 32 are slidably mounted on the drum 22 and they are maintained in their spaced relation by the use of a plurality of longitudinal rods 34 rigidly secured thereto. As best seen in Figures 1 and 5 three of the rings 32 have a pivoted section 36 which overlies the door 26 and may be hinged upwardly about hinges 38 by the removal of pins 40 thereby providing access to the interior of the drum for loading the drum with lime or other material to be dispensed.

As clearly seen in Figures 1 and 2 the spacer rod 34 is rigidly secured to a peripheral angle member 42 which is located adjacent the mid-part of the drum 22 and the angle member 42 is slidable with respect to the drum 22 and the angle member 42 is engaged by an actuating handle 44 which is pivotally attached to the tractor hitch 16. As clearly seen in Figures 3 and 6, as well as Figure 1, the angle member 42 is engaged by a pair of rollers 46 which are carried by the handle member 44 with one of the rollers 46 positioned on each side of the angle member 42. As the actuating handle 44 is pivoted about its pivotal connection with the tractor hitch 16 the rollers 46 engage the angle member 42 thereby moving it longitudinally of the drum and the angle member, in turn, moves the spacer rods 34 and peripheral rings 32 thereby covering or opening the dispensing apertures 24 as desired by the operator.

As best seen in Figure 2, the drum 22 has a plurality of baffles 48 movably positioned therein and secured to the axle 14 for adjustment there along by the use of set screws 50. The baffles 48 will maintain a substantially level upper surface of the lime in the drum 22 when the lime spreader is employed on an unlevel soil such as a hillside or other uneven terrain. The drum 22 is secured to the axle 14 by the use of a collar 52 having a set screw 54 therein as best shown in Figure 4.

The operation of the device will be readily understood. With the lime spreader 10 hitched to a tractor through the tractor hitch 16, the device is moved forwardly over the soil and the ground engaging wheels 12 are rotated and, in turn, rotate the axle 14 and the drum 22 and the baffles 48. With lime in the drum 22 the tumbling action will dispense the lime through the apertures 24 and the periphery of the drum 22 in an obvious manner. If the operator desires to reduce the flow of lime through the apertures 24 he moves handle 44 thereby sliding the rings 32 along the periphery of the drum 22 until the apertures 24 are closed partially, or if desired, closed entirely thereby regulating the flow of lime through the dispensing apertures 24. When the drum 22 becomes empty the tractor is stopped and the rings 32 moved to a closed position over the apertures 24 and the pins 40 are removed from the section 36 of three of the rings 32 and the section 36 along with the door 26 is raised and lime is shoveled into the drum through this opening. The recessed door 26 is then closed and secured by the hasp member 30 and the ring portions 36 are pivoted about their hinges 38 and secured by the pins 40 and the rings 32 are moved to an open position or a partially opened position as desired and the forward motion of the tractor and lime spreader will cause the lime to be dispensed from the openings 24.

As will be seen from the drawings no bearings are provided in the interior of the drum thereby eliminating any bearing failure due to the corrosive action of the lime and due to the tumbling action of the drum the lime will be efficiently discharged even when it is in a slightly damp or wet condition and the sliding rings give a regulation to the dispensing rate of the lime out of the drum.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A lime spreader comprising a pair of supporting wheels, an axle extending between and secured to said wheels, a drum mounted on and rotatable with said axle, a plurality of apertures in said drum, said apertures disposed in longitudinally spaced peripheral rows, a plurality of rigidly spaced peripheral rings slidably mounted on said drum, and actuating means engaging one of said rings for sliding said rings longitudinally for regulating the size of the apertures said drum being provided with an enlarged opening having a hinged closure door, said door having dispensing apertures, and the rings overlying the door having hinged sections for alignment with the door wherein the hinged sections and door may be opened thereby providing access to the interior of the drum.

2. A spreading device for finely ground material comprising a mobile support frame, a cylindrical drum mounted on said frame for rotation, means providing access to the interior of the drum for replenishing the supply of material being spread, means for rotating said drum, said drum having a plurality of apertures in the wall thereof with the apertures being disposed in longitudinally spaced circumferential rows for discharging the material, a plurality of rings encircling said drum and disposed for longitudinal sliding movement thereon, one of said rings being disposed adjacent each row of apertures for sliding movement into overlying relation to the adjacent row of apertures for controlling the flow of material from the drum, means rigidly interconnecting the rings for assuring simultaneous movement thereof, and means adjacent the center of said drum for simultaneously moving the rings in either direction.

References Cited in the file of this patent

UNITED STATES PATENTS

| | | |
|---|---|---|
| 230,244 | Crowell | July 20, 1880 |
| 489,313 | Lake et al. | Jan. 3, 1893 |
| 828,504 | Rapp | Aug. 14, 1906 |
| 835,379 | Tedford | Nov. 6, 1906 |
| 961,020 | Robinson | June 7, 1910 |
| 986,018 | Libner | Mar. 7, 1911 |
| 1,390,383 | Powell | Sept. 13, 1921 |
| 2,510,231 | Juzwiak | June 6, 1950 |
| 2,624,492 | Seltzer | Jan. 6, 1953 |